FLASH-PRODUCING APPARATUS EMPLOYING CIRCUITS INDEPENDENT
OF RECOVERY TIME OF FLASH DEVICE
Original Filed Nov. 4, 1964

INVENTOR
WILLIAM A. WARD

BY Rines and Rines

ATTORNEYS

United States Patent Office 3,354,351

Patented Nov. 21, 1967

3,354,351

FLASH-PRODUCING APPARATUS EMPLOYING CIRCUITS INDEPENDENT OF RECOVERY TIME OF FLASH DEVICE

William A. Ward, Norwood, Mass., assignor to United States Scientific Instruments, Inc., Watertown, Mass., a corporation of Massachusetts Continuation of application, Ser. No. 409,027, Nov. 4, 1964. This application Mar. 27, 1967, Ser. No. 626,344

3 Claims. (Cl. 315—240)

This application is a continuation of Ser. No. 409,027 filed Nov. 4, 1964, now abandoned.

The present invention relates to flash-producing apparatus and, more particularly, to circuits for producing high-speed high-intensity light flashes and the like by electrical discharges through flash lamps and the like.

Among the problems long-plaguing the electronics art in connection with repetitively pulsing flash tubes and related circuits has been the limitation upon the energy that can be discharged through gaseous-discharge flash tubes or the like at high repetition rates imposed by the inherent recovery or de-ionization time of such tubes.

An object of the present invention, accordingly, is to provide a new and improved flash-producing apparatus, the operation of which, in summary, is rendered substantially independent of the recovery or de-ionization time of the flash device and thus enables a vast increase in energy per flash and the flash repetition rate.

A further object is to provide a novel pulse-producing and/or flashing apparatus of more general utility, also.

Other and further objects will be explained hereinafter and will be more particularly pointed out in connection with the appended claims.

Figure 1:
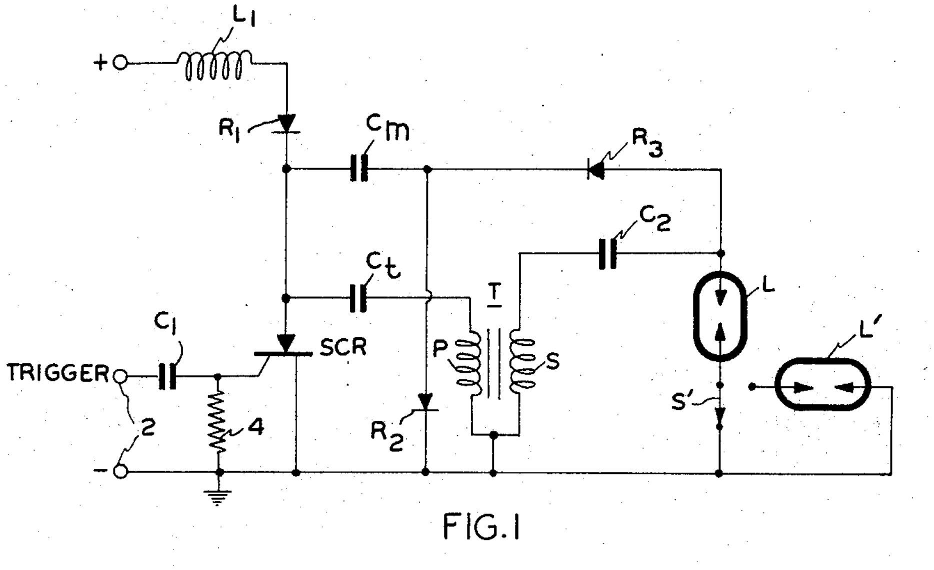
Figure 2:
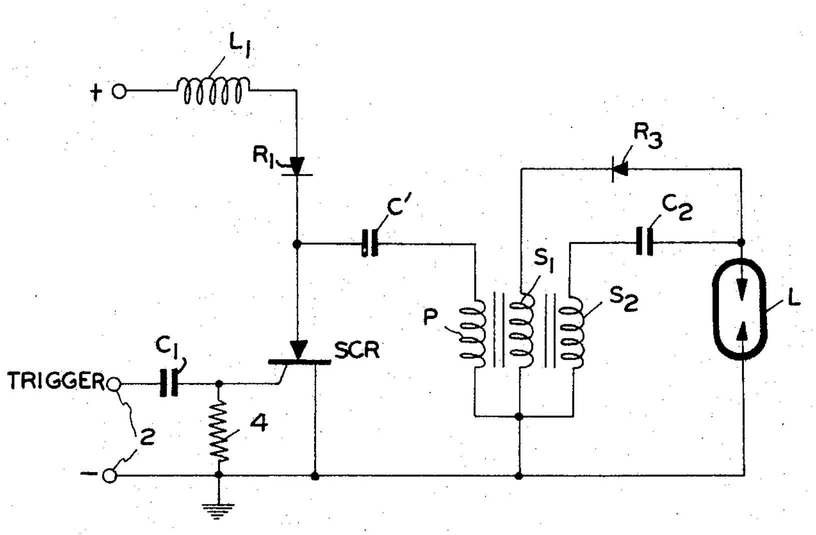

The invention will now be described with reference to the accompanying drawing, FIG. 1 of which is a schematic circuit diagram of a preferred embodiment of the invention; and FIG. 2 is a similar diagram of a modification.

Prior-art flash tube circuits embodying a trigger circuit for conditioning the flash tube for the discharge of stored energy built up thereacross, have employed the flash tube as the switch-controlling device in the energy-discharge circuit for releasing the main discharge of energy. Thus, the de-ionization time and tendency of the tube to "hold over" in conduction after a flash-producing discharge therethrough has affected the allowable quantity of discharged energy and repetition rate of flashing, as before discussed.

In accordance with the present invention, on the other hand, the stored energy producing the main discharge is not even applied to the flash device until the desired time of flash and the flash tube is not used as the switch-controlling element, the breakdown of which enables the discharge of stored energy and the production of a flash. To the contrary, the same switching device that produces the triggering impulse is also used to pass the main stored energy discharge current and in so doing to apply the stored discharge-producing energy as well as the trigger pulse to the flash tube substantially simultaneously and without dependence upon the breakdown of the flash tube as the switch-controlling element for the discharge. Thus the flash tube or other load is merely a passive energy-fed device the recovery time and holdover of which do not influence the re-charging or re-storage cycle of the circuit and hence the allowable repetition rate of flashing and the energy of the flashes.

Referring to FIG. 1, a gaseous-discharge flash tube or other normally de-energized load L to-be-pulsed or energized is associated with a main electrical energy storage circuit and a trigger circuit having respective energy storage means, illustrated as the respective capacitors $C_m$ and $C_T$. Each capacitor or other storage element is charged in parallel from a common preferably resonant circuit embodying inductance $L_1$ and rectifier $R_1$ traceable as follows: from the + voltage terminal through $L_1$ and $R_1$, $C_m$ and a proper-polarity-insuring further rectifier $R_2$ to the − or ground terminal; and from the + voltage terminal through $L_1$, $R_1$, $C_T$ and the primary winding P of trigger transformer T, to the − or ground terminal. The parts of the stored energy in both of $C_T$ and $C_m$ is, in accordance with the present invention and unlike many prior-art circuits, prevented from being applied to or across the flash tube or other load L at all times except when the flush is to be produced in response to a trigger impulse applied to input terminals 2 through a coupling capacitor $C_1$ across an input resistor 4 connected in the input circuit of a preferred silicon-controlled rectifier switch SCR, or other high-voltage-withstanding high-current-passing switch. Capacitor $C_2$ connected between the transformer preferably step-up secondary winding S and the upper principal electrode or terminal of the load device L, blocks or prevents the application of direct-current voltage from L; and appropriately poled rectifier $R_3$ and rectifier $R_2$ prevent any voltage stored in $C_m$ from being applied across the load L. Thus no voltage is applied to the flash device load in the quiescent condition in accordance with the invention.

At the time a trigger pulse is applied at input terminals 2, the SCR switch is rendered effective to conduct and both the trigger storage capacitor $C_T$ and the main storage capacitor $C_m$ discharge their stored energy through the SCR switch. The discharge of the part of the energy stored in $C_T$ in the circuit comprising the primary P and the conductive switch SCR (that renders the discharge circuit effective) causes a high-voltage trigger impulse to be produced in the secondary winding S and to be applied through $C_2$ to the load device L. The energy in $C_T$ thus, in effect, becomes discharged through the SCR switch and the load L. Simultaneously, $C_m$ discharges its stored energy through the conductive SCR switch in a direction such that current now passes $R_3$ and through the load L. Thus the energy stored in each of $C_T$ and $C_m$ effectively is discharged in circuits having in common the same conductive switch SCR and the flash tube or other load L. After the discharge, $C_m$ and $C_T$ re-charge as before and, since they are not connected during the charging to the load L, the recovery time of L or tendency therein to hold over in no way affects the re-charging and the rate thereof. Greater energy can be discharged through the flash device L, moreover, than is feasible in prior-art circuits subject to holdover and thus critical in applicable voltage.

In view of the above, moreover, more than one load can be used simultaneously as by the series-circuit connection that may be effected by operating selector switch S′ to the right to connect a further flash device or load L′ in circuit.

As an illustration, flash tubes rated for 5 watts in connection with their use in conventional prior-art circuits and for repetition flashing, as for stroboscopic purposes, up to several hundred cycles per second, have been successfully operated in accordance with the circuit of FIG. 1 at up to 30 watts flash output and with repetition rates of several thousands of cycles per second; and plural flash tubes L and L′ have been operated simultaneously and synchronously in series. Suitable voltage at the supply +, − has been of the order of 300 volts, and the step-up secondary winding S produced high-voltage trigger pulses of thousands of volts peak value.

While the energy storage devices $C_m$ and $C_T$ are shown charged from the same source, they could be charged from different sources; or, in some cases, they may be combined into a single storage capacitor or capacitor bank C', FIG. 2. The trigger pulse in this embodiment of FIG. 2 is produced by that part of the stored energy applied by step-up secondary $S_2$ through $C_2$ to the flash device or other load L; and the remainder of the stored energy in C' is simultaneously applied via the additional secondary winding $S_1$ (which may, for example, have the same number of turns as the primary P or less step-up than secondary $S_2$) and $R_3$ to the load L. As in the case of FIG. 1, the discharge circuits for applying both parts of the stored energy effectively includes the same switch SCR and load L. The same plurality of loads L, L', etc., employable with the circuit of FIG. 1 may also be used with the modification of FIG. 2.

Further modifications will also occur to those skilled in the art and all such are considered to fall within the spirit and scope of the invention as delineated in the appended claims.

What is claimed is:

1. Electric discharge producing apparatus having, in combination, a normally non-conductive impedance breakdown load device, a transformer having a primary winding and a secondary winding, a normally non-conductive electric switch, triggering capacitance means connected in series with said primary winding across said switch, means for charging said capacitance means, trigger means for rendering said switch conductive to discharge said capacitance means therethrough, a capacitor connected in series with said secondary winding across said breakdown device for applying a triggering voltage to said device to render it conductive when said switch is rendered conductive, main storage capacitance means, means for charging said main storage capacitance means, and means including a rectifier connected in series with said breakdown device for discharging the energy stored in said main storage capacitance means through said switch, said rectifier, and said breakdown device when said breakdown device is rendered conductive, said rectifier being poled to pass said discharging energy with low impedance but to provide high impedance during charging of said main storage capacitance means.

2. The apparatus of claim 1, said main storage capacitance being a capacitor separated from said triggering capacitance means and being directly connected in series with said rectifier.

3. The apparatus of claim 1, said triggering capacitance means and said main storage capacitance means comprising a common capacitor, said transformer having an additional secondary winding connected in series with said rectifier across said breakdown device.

No references cited.

JOHN W. HUCKERT, *Primary Examiner.*

J. D. CRAIG, *Assistant Examiner.*